(12) United States Patent
Yoo

(10) Patent No.: US 7,595,076 B2
(45) Date of Patent: Sep. 29, 2009

(54) MOLECULAR PRESS DEHYDRATING AGENTS FOR VEGETATIVE TISSUE COMPRISING STARCH HYDROLYSATES OR THEIR DERIVATIVES

(76) Inventor: Myung-Shik Yoo, 1133-201, Jangmi Apartment, 1092, Sanbon-dong, Gunpo-city, Kyunggi-do (KR) 435-040

( * ) Notice: Subject to any disclaimer, the term of this patent is extended or adjusted under 35 U.S.C. 154(b) by 590 days.

(21) Appl. No.: 10/555,779

(22) PCT Filed: May 8, 2004

(86) PCT No.: PCT/KR2004/001069

§ 371 (c)(1),
(2), (4) Date: Nov. 7, 2005

(87) PCT Pub. No.: WO2004/099255

PCT Pub. Date: Nov. 18, 2004

(65) Prior Publication Data

US 2007/0020367 A1      Jan. 25, 2007

(30) Foreign Application Priority Data

May 9, 2003      (KR) ..................... 10-2003-0029372

(51) Int. Cl.
A23L 1/212      (2006.01)
(52) U.S. Cl. .................. 426/578; 426/615; 426/640
(58) Field of Classification Search .................. 426/578, 426/615, 640, 74, 620, 639, 658
See application file for complete search history.

(56) References Cited

U.S. PATENT DOCUMENTS

| 2,420,517 | A |   | 5/1947 | Brandner et al. |
| 4,345,973 | A |   | 8/1982 | Ladisch et al. |
| 4,788,072 | A |   | 11/1988 | Kawamura |
| 4,819,342 | A | * | 4/1989 | Matsubara et al. ............. 34/95 |
| 4,832,969 | A |   | 5/1989 | Lioutas |
| 5,227,183 | A |   | 7/1993 | Aung |
| 2005/0147717 | A1 | * | 7/2005 | Peremans .................... 426/102 |

FOREIGN PATENT DOCUMENTS

| GB | 2114865 A | 9/1983 |
| JP | 60006159 A2 | 1/1985 |
| JP | 63287544 A2 | 11/1988 |

OTHER PUBLICATIONS

Choi, et al., Korean J. Food & Nut. 12(6):582-587, Nov. 6, 1999.

* cited by examiner

*Primary Examiner*—Helen F Pratt
(74) *Attorney, Agent, or Firm*—Rothwell, Figg, Ernst & Manbeck, P.C.

(57) ABSTRACT

The present invention relates to a molecular press dehydrating agents for vegetative tissues comprising starch hydrolysates or their derivatives. Preferably, the starch hydrolysates of the present invention may be maltodextrin specifically, and the derivatives of starch hydrolysates may be a modified starch, main component of which is starch sodium octenyl succinate. The molecular press dehydrating agents of the present invention may comprise sodium caseinate of low molecular weight additionally. The molecular press dehydrating agents of the present invention can cause cytorrhysis phenomenon and dehydrate plant tissues by mixing them together. While the molecular press dehydrating agents of the present invention show superior dehydration and drying effect in a similar level to existing dehydrating agents, there are no limitations for food use in legal, social and economical aspect, and it can be supplied in large quantities. Therefore, the dehydrated tissues and exudates obtained by using the dehydrating agents of the present invention may be usefully applied to various fields of manufacture such as foods and beverages, feeds, beauty materials, medicines, flavorings, agricultural chemicals, coloring agents, etc.

6 Claims, 1 Drawing Sheet

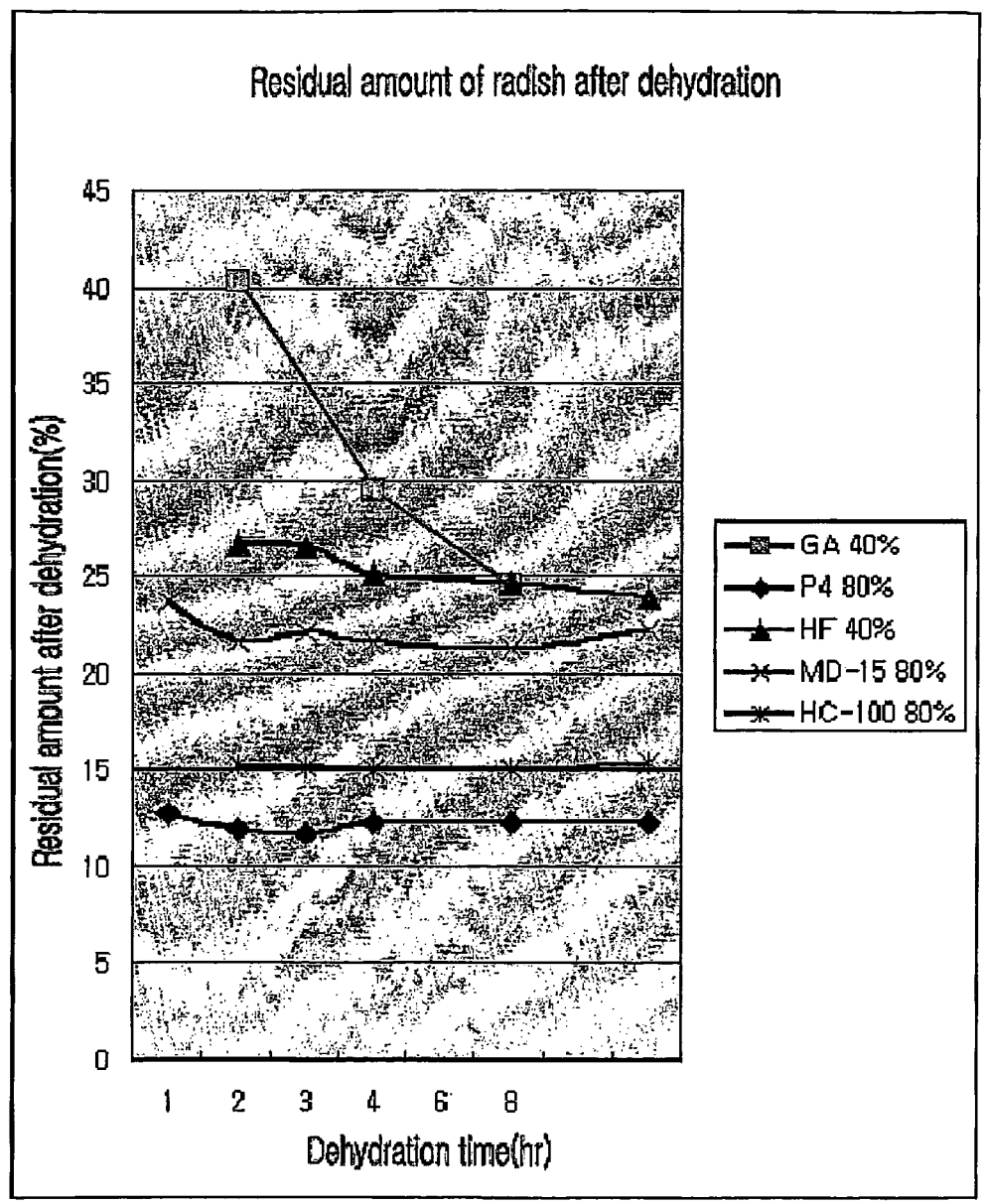
[FIG. 1]

US 7,595,076 B2

MOLECULAR PRESS DEHYDRATING AGENTS FOR VEGETATIVE TISSUE COMPRISING STARCH HYDROLYSATES OR THEIR DERIVATIVES

CROSS REFERENCE TO RELATED APPLICATIONS

This application is a 35 USC § 371 National Phase Entry Application from PCT/KR2004/001069, filed May 8, 2004 and designating the United States.

BACKGROUND OF THE INVENTION

1. Field of the Invention

The present invention relates to molecular press dehydrating agents and a molecular press dehydration method for vegetative tissues using the same. Dehydration method of vegetables is a very useful technology in the fields of foods and beverages, feeds, cosmetics and pharmaceuticals industries.

2. Description of the Prior Art

Traditional dehydration and drying methods of vegetative tissues include osmotic dehydration, hot air drying, freeze drying, etc. Osmotic dehydration includes salting method and sugaring method using salts such as the table salt and using sugars such as sucrose as dehydrating agents respectively.

This method has an advantage in that the initial dehydration rate is high. However, the final amount of dehydration is small, and a large amount of the dehydrating agent permeated into the cell wall affects the taste and quality of dehydrated tissues adversely. Further, this method is disadvantageous in that the dehydrating agent lowers rehydration quality of tissues after drying because it denatures cell wall components during dehydration Hot air drying is a traditional dehydration method for vegetative tissues by heated dry air. This method is advantageous in economical aspect, but it is difficult to be used for processing high-grade food because the heat deteriorates the quality such as colors, flavors and texture of dehydrated tissues.

In freeze drying method, the quality of food is maintained excellently since food components are less changed compared to other methods. However, the texture of tissues is damaged greatly since cell tissues are destroyed by freezing. Due to high processing cost, this method is only applied to some high-grade foods.

For the above reason, the present inventor developed molecular press dehydration method and applied it for a patent that is a new technology for the dehydration of vegetative tissues. The molecular press dehydration method depends on cytorryhsis phenomenon. Cytorrhysis is a phenomenon of enforcing dehydration of the cell by contraction where the polymers, if their sizes are greater than those of the pores of the cell wall, are unable to be permeated into the cell wall, and the cells are contracted and distorted by the diffusion pressure of polymer molecules applied to the cell wall outside, when vegetative tissues are in the concentrated solution of those water-soluble polymers.

A large amount of moisture can be dehydrated by molecular press dehydration method compared to osmotic dehydration. Moreover, the molecular press dehydration method does not deteriorate components in the cell including cell wall, and facilitates drying followed by molecular press dehydration, and has lesser adverse effects on taste and flavor of tissue. Also, the dried tissue by this method can be restored in the state of almost fresh tissue when rehydrated with water.

Because a large amount of dehydrate exudated in the process of molecular press dehydration is not in dilution with added water, the useful component is highly concentrated and flavor is almost natural. And high concentration of dehydrating agent eliminates spoilage by microorganisms and deterioration by oxidation considerably, therefore it raises the utilization of dehydrate.

The substances used for the dehydrating agents in molecular press dehydration method should be water soluble polymers which has a molecular size greater than the pore size of the cell wall of plant cells, therefore they make a molecular diffusive pressure only outside the cell, and should maintain gradients in concentration of dehydrating agents in and out of the cells continuously.

The present inventor has disclosed various soluble polymers which can be used for the dehydrating agents in this molecular press dehydration method of Korean Patent Application No. 10-2001-69777.

For example, the water soluble polymers such as PEG (polyethylene glycol), gum arabic, arabinogalactan, egg albumin, milk proteins or soy proteins could be used for molecular press dehydration of various plant tissues efficiently, but these polymers have kinds of inherent problems as followings.

PEG is a synthetic polymer substance with a great solubility in water and the viscosity of water solution of PEG is low. Therefore PEG is the best substance among the above dehydrating agents for molecular press dehydration method. But, owing to the fact that PEG is a chemically synthesized compound, there are some legal limitations on food use, and average consumers are concerned about the acceptance of it.

Gum arabic, arabinogalactan, and egg albumin are easily soluble in water and the viscosity of the water solution is low. And they are natural substances, so they are suitable molecular press dehydrating agents for food use. But, compared to PEG, they have a less dehydrating efficiency, and make dehydrated products of quite low quality, and are less economical due to higher prices. Particularly, gum arabic and arabinogalactan may bring about a short supply when they are used in large quantities. In case of egg albumin, the exudates can be easily spoiled by microorganisms during dehydration and storage after dehydration.

Milk proteins and soy proteins are advantageous in that they are natural sources which can be supplied in large quantities, but they have a lot of problems in practical use because the above proteins generally available at the present time are less soluble in water, and the viscosity of their water solutions are rather great.

As mentioned above, when vegetative food materials are dehydrated and dried only with the above molecular press dehydrating agents, there are problems in respects not only of regulations, social acceptance and economy but also of supply. Accordingly, there remain subjects to study and develop molecular press dehydrating agents which can be supplied in large quantities while being of natural origin.

Proposed in the present invention is molecular press dehydrating agents and an effective method of dehydration of vegetative tissues with a high yield of dehydration, without application problems in respects of regulations, social acceptance and economy, and capable of being supplied smoothly and in large quantities.

SUMMARY OF THE INVENTION

The present invention provides molecular press dehydrating agents for vegetative tissue comprising starch hydrolysates or their derivatives.

The starch hydrolysates used for molecular press dehydrating agents in the present invention refers to collections of decomposed fragments of native starches by physical and/or chemical decomposition.

Native starch is a polymer substance of glucose molecule basically, and it is composed of two components, one is amylose composed of linear glucose chain polymers and the other is amylopectin composed of linear and branched glucose chain polymers. When native starch is hydrolyzed, the glucose-glucose linkages are broken randomly and starch fragments of a wide spectrum of sizes are obtained. Owing to the difference in size, the starch fragments have other physical properties than native starches.

Native starch in the state of not being decomposed is so bigger than the pore size of the plant cell wall that it does not induce cytorrhysis. On the other hand, the starch hydrolysate used in the present invention contains starch fragments with the size of not smaller than 3.5 nm in large quantities, and some smaller starch fragments. The size of 3.5 nm in diameter is a little bigger than the pore size of the plant cell wall and it is a best size to make cytorrhysis. Accordingly, starch hydrolysate in the present invention induces cytorrhysis and makes dehydration of vegetative tissues effectively when mixed with vegetative tissues.

As a decomposition method of starch in the present invention, all of the commonly used method in the art is applicable. More specifically, acid treatment, reaction by enzyme such as α-amylase or heat treatment, etc. can be an example. In the present invention, one of the above method or combination of the methods could be used as occasion demands.

For an example, starch hydrolysate in the present invention can be obtained through the processes of liquefaction of natural starch into slurry of about 30-40%, hydrolysis by acid or α-amylase, purification and drying.

Starch hydrolysates which can be used as dehydrating agents in the present invention may be one or more selected among various dextrins.

The most desirable starch hydrolysate as dehydrating agent in the present invention is maltodextrin.

Maltodextrin is a dextrin which dextrose equivalent (DE) is 25 and lower, and commercialized down to around DE 1 product The lower the DE is, the bigger the average molecular weight is. And the higher the DE is, the smaller the molecular size is, therefore the content of lower molecular sugars such as dextrose and maltose, etc. is high. If the content of lower molecular sugars is too high, that causes osmosis and hinders molecular press dehydration.

The derivatives of starch hydrolysates which can be used as dehydrating agents in the present invention refer to reduced substances of the above starch hydrolysates or refer to substances of the above starch hydrolysates in which various kinds of functional groups such as sorbitol, citric acid and succinic acid, etc. are chemically linked or polymerized.

The derivatives of starch hydrolysates which can be used as dehydrating agents in the present invention include one or more selected from polydextrose; fractions of derivatives of amylopectin or amylose; cationic starches substituted by imino alkyl, ammonium alkyl, amino alkyl, etc.; cross linked starches substituted by ethylidene, methylene, etc.; etherified starches substituted by carbamyl ethyl, benzyl, allyl, methyl, sulfo alkyl, cyano ethyl, carboxy alkyl, hydroxyl alkyl, etc.; esterified starches substituted by sulfonate ester, aromatic ester, fatty acid ester, carbamate, etc.; dialdehyde starch and its derivative; and gelatinized starch, etc.

The most desirable derivative of starch hydrolysate as dehydrating agent of the present invention is a modified starch, in specific, main component of which is starch sodium octenyl succinate.

Starch sodium octenyl succinate is one of the esterified starches that hydrophobic octenyl group is linked to dextrin of low molecular weight, and it is a modified starch manufactured for encapsulation and spray drying of fat and oils or oil soluble flavor components.

Starch sodium octenyl succinate is highly soluble in water, and the solution is an opaque suspension. However, since the viscosity is lower than that of gum arabic, the dosage can be increased sufficiently. Starch sodium octenyl succinate can also hinder molecular press dehydration like as maltodextrin does, if the content of lower molecular sugars is high In addition, sodium caseinate of low molecular weight can be used as a dehydrating agent of the present invention Sodium caseinate of low molecular weight is a substance obtained by addition of sodium after hydrolyzing milk casein, and it is a foaming agent of which solubility and foaming capability are increased.

As sodium caseinate of low molecular weight has a relatively high solubility and low viscosity, it can accomplish molecular press dehydration effectively, but it has disadvantages of bitter taste due to peptides of low molecular weight, bad smell and foaming.

The solubility, transparency and viscosity of the dehydrating agents of the present invention described above, PEG 4000 that is a representative water-soluble polymer for molecular press dehydration, and gum arabic are listed to compare in Table 1.

TABLE 1

| Polymer | Concentration % | Solubility | Transparency | Viscosity |
| --- | --- | --- | --- | --- |
| PEG 4000 | 56 | perfect soluble | perfect clear | low |
| Gum Arabic | 40 | soluble | some opaque brown | high |
| Maltodextrin DE 15 | 60 | perfect soluble | Perfect clear | medium |
| Starch sodium octenyl succinate | 50 | suspension | opaque cloudy | medium |
| Sodium caseinate of low molecular weight | 40 | soluble | opaque | low |

As shown in Table 1, the dehydrating agents of the present invention are highly soluble in water and highly concentrated solutions can be made with low viscosities. Therefore molecular diffusion can take place easily and these agents have all essential factors as water-soluble polymer substance for molecular press dehydration.

Practically, the molecular press dehydrating agents of the present invention make it possible to obtain exudates and dried product of superior quality with similar level of dehydration efficiency to PEG 4000 which is known to the best among the existing molecular press dehydrating agent or gum arabic. At the same time, they can be utilized without any legal or social limitations contrary to PEG 4000 which is rarely applicable for food use, and can make it possible to reduce dehydration time remarkably compared to gum arabic which requires a long dehydration time.

The components included in the molecular press dehydrating agents of the present invention were derived from starch or milk protein, therefore, their resources are unlimited and exhaustion is not expected, and their prices are cheaper compared to existing dehydrating agents and provide a benefit of cost reduction.

Besides the above components, the molecular press dehydrating agents of the present invention can comprise additional similar components which functions similarly to those of the above component to increase efficiency of molecular press dehydration.

The molecular press dehydrating agents of the present invention can comprise additional components which have different functions from the above components as necessity requires.

Furthermore, the present invention provides the molecular press dehydration method for plant material using the above dehydrating agents.

The molecular press dehydration method of the present invention is characterized by mixing sliced vegetative tissues with the dehydrating agents of the present invention in the solid-state or concentrated solution, and separating dehydrated tissues and exudates such as dehydrated liquid through filtration or centrifugation after dehydration of the sliced vegetative tissues.

The solid-state in the present invention refers to the state of crystals or powder or a dispersion in which a part of the polymers is dispersed in the solid state such as crystals or powder where more polymers than necessary to be a saturated solution are mixed with water.

If the dehydrating agents of the present invention are used in the solid state, the amount needed is very small. That is, only with the same amount as that of a plant material or less, down to 20-30% of them, it is possible to dehydrate plant materials effectively and to improve quality and keeping property of exudates and dehydrated tissues.

It is possible to increase the initial dehydration speed by mixing a low-molecular-weight dehydration aid to the polymer to eliminate the turgor pressure of vegetative tissues and accelerate exudation of moisture at the beginning of dehydration. However, since the dehydrating agents of the present invention contain low-molecular-weight substances in part as their own compositions, it is not necessary to add dehydration aid such as salts, sugars, or sugar alcohols additionally for the purpose of accelerating initial dehydration.

Also, according to the molecular press dehydration method of the present invention, with mixing a pH modifier to the polymer it is possible to minimize pH change or change in quality such as discoloration, etc. that may occur due to pH change by addition of dehydrating agents. In the molecular press dehydration method of the present invention, for a pH modifier, an inorganic acid and alkali such as hydrochloric acid, sulfuric acid, sodium hydroxide, etc., or an organic acid such as acetic acid, citric acid, malic acid, tartaric acid, etc. or any of their salts may be used.

According to the molecular press dehydration method of the present invention, it is possible to increase the speed and amount of dehydration by adjusting the temperature of dehydration to 45-65° C.

According to the molecular press dehydration method of the present invention, it is possible to increase the speed and amount of dehydration and the speed of rehydration by maximizing the surface area that can come in contact with the polymer by cutting the plant material to be dehydrated thinly or cutting it in a direction facilitating diffusion of the polymer.

According to the molecular press dehydration method of the present invention, dehydrated tissues and exudates are separated from each other by filtration or centrifugation of the dehydrated tissues. Also, in the molecular press dehydration method of present invention, the dehydrated tissues may be used as they are or ground to be a paste.

According to the molecular press dehydration method of the present invention, a considerable amount of the dehydrating agent remaining on the surface of dehydrated tissues can be removed by washing the dehydrated tissues promptly with water, concentrated dehydrating solution with a lowered viscosity, concentrated sugar with a low viscosity or salt solution after the dehydrated tissues are filtered or separated by a centrifuge. Although washing the dehydrated tissues again with water, etc. may seem to be contradictory to its original purpose, the moisture permeated into the tissues can be dried easily as the permeation speed of moisture into the tissues during washing is slow and a part of moisture permeated into the tissues remains only on the surface of the tissues.

Therefore, according to the molecular press dehydration method of the present invention, the washing process prevents adhering of tissues during drying by removing a considerable amount of the dehydrating agent remaining on the surface of tissues without greatly affecting drying of tissues, and rather facilitates drying in some cases by preventing formation of the films of the dehydrating agent on the surface of tissues during drying. Also, it is possible to improve the appearance and quality of dried tissues by preventing the crystal formation of the dehydrating agent on the surface of dried tissues and by reducing the amount of the dehydrating agent remained in dried tissues through the washing process.

The tissues obtained by the dehydration method of the present invention are dried readily by warm air drying or hot air drying or ambient air drying. In a large-scale process, the rate of drying may be increased by using a machine that can perform centrifugation, washing, dehydration and drying continuously. But the tissues may be dried easily even when they are left at a room temperature without a separate process although the drying speed is low. The remaining moisture is evaporated easily since only a small amount of moisture remains in the tissues as most of moisture is dehydrated out of the cells without damaging cellular tissues and the resistance to the transfer of moisture in tissues is negligible. Also, the polymers remaining in the tissues may prevent browning since they protect the tissues from being exposed directly to the air, and they prevent spoilage by microorganisms.

Accordingly, the molecular press dehydration method of the present invention may have the maximum dehydration effect while using the minimum amount of polymers, and increase the quality and preservation ability of not only dehydrated tissues but also dehydrated exudates.

According to the molecular press dehydration method using the dehydrating agents of the present invention, since the polymers do not permeate into the cell, it is possible to protect the change in useful components in the cell, and since polymers are applied on tissue surface during dehydration and drying so as tissue components not to be exposed directly to the air, it is possible to prevent oxidation or browning. Also, since the high concentration of dehydrating agent in exudates controls microbial growth and retards spoilage, it is possible to increase the quality and preservation ability of not only dehydrated tissues but also dehydrated exudates.

Also, according to the molecular press dehydration method using the dehydrating agents of the present invention, it is possible to dehydrate in a short time, to utilize the exudates together, and to obtain much more superior qualities compared to the hot air drying or freeze drying used conventionally.

Since the dehydrated tissues and dehydrated exudates obtained by the molecular press dehydration method using the dehydrating agents of the present invention have much more superior quality in color, flavor, texture, etc. to those obtained by conventional methods, this method can be applied to a wide variety of vegetables. Also, the dehydrating agents of the present invention can be widely utilized for food use, since they consist of components that are not restricted by law or social acceptance.

Accordingly, the dehydrated tissues and dehydrated exudates obtained by using the molecular press dehydrating agents in the present invention may be usefully applied to various fields such as foods and beverages, feeds, beauty materials, medicines, flavorings, agricultural chemicals, coloring agents, etc.

BRIEF DESCRIPTION OF THE DRAWING

FIG. 1 is a diagram showing the amount of dehydration and the rate of dehydration by molecular press dehydrating agents when radish tissues are dehydrated;

DETAILED DESCRIPTION OF A PREFERRED EMBODIMENT OF THE INVENTION

The molecular press dehydrating agents and the molecular press dehydration method of the present invention using the same are illustrated in a preferred embodiment as follows, where the examples of embodiment listed below are for the illustration of embodiment only, and the range of the invention is not limited to those listed below.

EXAMPLE 1

Dehydration of Radish Using the Molecular Press Dehydrating Agents of the Present Invention Radish tissues were dehydrated using the molecular press dehydrating agents of the present invention.

As the molecular press dehydrating agents of the present invention, maltodextrin (DE 15), a modified starch which main component is a starch sodium octenyl succinate (HI-CAP 100, National Starch & Chemical) and a foaming agent which main component is sodium caseinate of low molecular weight (Hyfoama DS, Quest) were used.

In order to investigate capability of molecular press dehydration of dehydrating agents in the present invention, an experiment of dehydration with radish was conducted together with PEG 4000 and gum arabic which are existing molecular dehydrating agents.

The dehydrating agents in the amount of 40-80% of that of radish tissues were mixed with radish tissues that were sliced to have a thickness of 1 mm, and the mixtures were left to dehydrate for an hour to 8 hours. After dehydration, they were separated into dehydrated tissue and exudate by centrifuging for 5 minutes. The remaining amount of dehydration, that is, the amount of dehydrated tissue was measured, and the result is shown in FIG. 1. As shown in FIG. 1, when maltodextrin (DE-15) or starch sodium octenyl succinate (HC-100) was used, dehydration was almost finished in 2 hours after radish tissue was mixed with it like as in case of using PEG 4000 (P4).

Meanwhile, in case of sodium caseinate of low molecular weight (HF), dehydration was progressed rapidly up to 2 hours, and after that dehydration continued slowly. But the rate of dehydration was proved to be greater than that of gum arabic where the dehydration was progressed slowly for up to 8 hours.

Accordingly, it can be seen that the molecular press dehydrating agents of the present invention have a similar level of dehydration ratio to PEG 4000, and may dehydrate more amount of water with higher rate compared to gum arabic (GA). Therefore they may be used as practical molecular press dehydrating agents.

EXAMPLE 2

Dehydration Experiments of Other Materials Using the Molecular Press Dehydrating Agents of the Present Invention In order to confirm utilization of molecular press dehydrating agent of the present invention, experiments were conducted with a wide variety of vegetable materials such as aloe, cucumber, potato, apple, etc.

The experiments were conducted by the same method as the above experiment described in example 1, and the result is shown in Table 2.

TABLE 2

| Dehydrating agent | Amount of dehydrating agent, % | Plant material | Dehydration time, hours | Residual amount after dehydration, % | Dried wt. to dehydrated tissue, % |
|---|---|---|---|---|---|
| PEG 4000 | 80 | aloe | 20 | 7.7 | 52.1 |
|  |  | cucumber | 4 | 7.8 | 54.3 |
|  |  | potato | 5 | 26.0 | 78.1 |
|  |  | apple | 5 | 17.6 | 57.7 |
| Gum arabic | 40 | aloe | 20 | 17.1 | 24.1 |
|  |  | cucumber | 5 | 14.9 | 22.6 |
|  |  | potato | 24 | 42.1 | 46.9 |
|  |  | apple | 24 | 24.6 | 36.6 |
| Maltodextrin (DE 15) | 80 | aloe | 20 | 8.9 | 47.1 |
|  |  | cucumber | 4 | 10.9 | 45.9 |
|  |  | potato | 24 | 32.8 | 71.4 |
|  |  | apple | 5 | 20.7 | 54.9 |
| Starch sodium octenyl succinate | 80 | aloe | 20 | 8.5 | 48.1 |
|  |  | cucumber | 5 | 9.6 | 50.4 |
|  |  | potato | 24 | 30.6 | 70.5 |
|  |  | apple | 5 | 20.9 | 55.7 |
| Sodium caseinate of low MW | 40 | aloe | 20 | 18.8 | 34.1 |
|  |  | cucumber | 23 | 16.6 | 38.2 |
|  |  | potato | 24 | 36.3 | 60.9 |
|  |  | apple | 24 | 23.2 | 42.1 |

As shown in Table 2, maltodextrin and starch sodium octenyl succinate of dehydrating agents of the present invention showed a little bit low or similar level of dehydration abilities than PEG 4000 of existing dehydrating agent.

Also, in dehydration time, maltodextrin and starch sodium octenyl succinate of dehydrating agents of the present invention finished dehydration in a short time similar to PEG 4000 of existing dehydrating agent except potato.

Sodium caseinate of low molecular weight showed similar dehydration ability and dehydration rate to gum arabic, but the ratio of dried weight to dehydrated tissue weight is considerably great, so actual dehydration ability seems to be greater than gum arabic.

Accordingly, the molecular press dehydrating agents of the present invention are proved to be able to dehydrate a wide variety of vegetative tissue with superior dehydration ability in a short time.

EXAMPLE 3

Identification of the Quality of Dehydrated Product Obtained Using the Molecular Press Dehydrating Agents of the Present Invention The quality of dehydrated product obtained using molecular press dehydrating agents of the present invention was identified with dehydrated exudate and dehydrated/dried tissue separately.

1) Dehydrated Exudate

By the same method as the above example 1 aloe, cucumber, apple and potato were dehydrated using the molecular press dehydrating agent of the present invention and the obtained exudates were compared in color, odor and taste, etc. after storage of seven days, and the result is shown in Table 3.

TABLE 3

| Plant material | Dehydrating agent | Color | Odor | Taste | Others |
|---|---|---|---|---|---|
| Aloe | P4 | Pink | Light grassy | Greasy, tasteless | Flavor is best |
| | GA | Dark pink, little cloudy | Heavy grassy | | |
| | DE-15 | Light greenish brown | Very light grassy | Slightly bitter | No change in color |
| | HC-100 | Light pink, turbid | Grassy, floral | | |
| | HF | Pinky brown, cloudy | Baking soda | | |
| Cucumber | P4 | Very light green | Refreshing cucumber | | Flavor is best |
| | GA | Yellowish light brown, little cloudy | Slightly heavy cucumber | | |
| | DE-15 | Light green | Heavy cucumber | Cucumber juice | Taste is best |
| | HC-100 | White, dull | buttom spreading cucumber, starch odor | | |
| | HF | Yellow, turbid | Baking soda | | |
| Apple | P4 | Juice color, Yellowish light brown | Apple flavor | | Flavor is best |
| | GA | Dark green to black, cloudy | Heavy apple | | Flavor is excellent |
| | DE-15 | Dark yellowish green | Faint apple | Apple juice | Taste is best |
| | HC-100 | yellowish green, turbid | Apple, browning tincture | | |
| | HF | Brown, turbid | Baking soda | | |
| Potato | P4 | Light red, little loudy | Fresh potato | | Flavor is best |
| | GA | Light black, little cloudy | Sour, spoiled? | | |
| | DE-15 | Deep black | Odorless | Tasteless except sweet | |
| | HC-100 | Gray, turbid | Grassy-potato | | |
| | HF | Yellowish brown, turbid | Soda-nauseating | | |

(P4: PEG 4000, GA: gum arabic, D-15: maltodextrin (DE 15), HC-100: starch sodium octenyl succinate, HF: sodium caseinate of low molecular weight.)

As shown in Table 3, the dehydrated exudates obtained using maltodextrin of dehydrating agent of the present invention proved to be similar in superior quality to the exudate using PEG 4000 of existing dehydrating agent.

Aloe is generally discolored to pink color by oxidation. However, the aloe exudates obtained by using maltodextrin maintained its own natural color, light green, and was almost odorless, and aloe's sweet taste was harmonized with bitter taste. Therefore the exudate was suitable for food use.

In case of apple too, the exudate obtained by using maltodextrin was kept in fresh state in color, odor and taste.

In case of potato, the deep black exudates was obtained since the exudates obtained by using maltodextrin showed extreme browning phenomenon, but it was nearly odorless and tasteless and it may be utilized for expressing natural color such as gray or caramel on food.

The exudates obtained by using starch sodium octenyl succinate, another dehydrating agent of the present invention showed sufficient level of quality for food use, although the qualities in color, odor and taste are more or less poor compared to that of maltodextrin.

Since sodium caseinate of low molecular weight that can be used additionally in the present invention strongly smells soda-like odor, it seems to be difficult to use for food.

Meanwhile, the exudates obtained using the dehydrating agents in the present invention proved to have a good keeping quality by the results that they were not spoiled or deteriorated easily after a long period of storage in refrigerated or room temperature condition.

2) Dehydrated/Dried Tissue

Aloe, cucumber, apple and potato were dehydrated by the molecular press dehydrating agent of the present invention and the obtained dehydrated and dried tissues were evaluated in color and shape, odor and taste, and rehydration quality, and the result is shown in Table 4.

TABLE 4

| Plant material | Dehydrating agent | Color and shape | Odor | Taste | Rehydration quality (around 2 hours later) |
|---|---|---|---|---|---|
| Aloe | P4 | Gel-light pink | Grassy pungent | | Perfect rehydrated, mucous liquid |
| | GA | Peel-dark green/black, Gel-brown | Heavy grassy | | Unfolded, but no mucus, light green |
| | DE-15 | Natural color, twisted | Heavy grassy | Bitter, fishy after sweet | Enlarged but unfolded partially, little slimmy tissue |
| | HC-100 | Faded color, twisted tight | Grassy cooked | | Not unfolded, yellow tissue |
| | HF | Peel-dark green, Gel-yellow | Roasted grain | | Not unfolded easily, rough surface |
| Cucumber | P4 | Bright and light green | Heavy grassy | | Perfect rehydrated after 3 hours |
| | GA | Dark green | Heavy grassy | | Half rehydrated, not unfolded easily |
| | DE-15 | Dark green | Heavy grassy | Weak cucumber | Not rehydrated easily, contracted |
| | HC-100 | Faded green | Grassy cooked | | Contracted |
| | HF | Light yellow | Roasted grain | | Almost rehydrated, very stiff |
| Apple | P4 | Light greenish yellow, little fluorescent | Grassy | Tasteless | Perfect rehydrated |
| | GA | Brown by browning | Apple flavor | Weak apple | Rehydrated curved, thin tissue |
| | DE-15 | Natural apple | Grassy | Weak apple | Soft, thin tissue |
| | HC-100 | Natural apple dried not easily | Apple flavor | Tasteless | Soft, thin tissue |
| | HF | Dark brown by browning | Roasted flavor, Baking soda | | Brown, unfolded, stiff |
| Potato | P4 | White- not browned | Fresh potato as it is | Acrid potato | Perfect rehydrated |
| | GA | Black by heavy browning | Fresh potato Deeper | Not acrid | Unfolded but less stiff |
| | DE-15 | Complete black | Fresh potato | Strong acrid | Dark gray, almost unfolded |
| | HG-100 | Gray, browned lightly | Fresh potato | Potato-bitter | Thin tissue, imperfect unfolded |
| | HF | Yellow, black pattern | Roasted flavor | | Almost stiff, extremely browned |

As shown in Table 4, the dehydrated and dried tissues obtained using maltodextrin and starch sodium octenyl succinate of the dehydrating agent of the present invention proved to be almost similar but a little low in quality level to those obtained using PEG 4000 of existing dehydrating agent. Compared to the case of using gum arabic, it was much more superior in color, and similar in odor and taste.

Meanwhile, the dehydrated and dried potato tissue obtained using maltodextrin was extremely browned like as the exudates. Therefore it seems to be utilized as natural colorant.

A large amount of sugar was removed with the dehydrated water during the dehydration process when fruits such as apple in which sugar content is high are dehydrated, therefore the content of sweet component in tissue is reduced and the taste of dried tissue become inferior, but the utilization for dietary fiber seems to be higher because it has a better taste compared to dietary fiber from grains.

The dehydrated and dried tissue obtained using sodium caseinate of low molecular weight which can be used additionally in the present invention smells roasted grain-like flavor other than the original flavors of fruits and vegetables. Therefore the utilization is more or less low, but it has a less nauseating odor and advantage of good rehydration quality.

By the above facts, the exudates and the dehydrated and dried tissues obtained by using the molecular press dehydrating agents of the present invention proved to show a superior quality level similar to those of using existing dehydrating agents.

The molecular press dehydrating agents of the present invention make it possible to obtain exudates and dehydrated and dried tissue of superior quality with similar level of dehydration efficiency to existing dehydrating agents. In the meantime, they are applicable widely without limitations in respects of regulations, social acceptance unlike PEG 4000 that is rarely applied for food use, and make it possible to reduce dehydration time remarkably compared to gum arabic that needs a long period of dehydration time.

The molecular press dehydrating agents of the present invention are originated from starch or milk protein, and therefore, their resources are unlimited and exhaustion is not expected, and their prices are cheaper compared to existing dehydrating agents and give a benefit of cost reduction.

The exudates and the dehydrated and dried tissues obtained by molecular press dehydration method using molecular press dehydrating agents of the present invention have an excellent preservation property through eliminating spoilage by microorganisms and deterioration by oxidation considerably as same as those obtained by using existing molecular press dehydrating agents.

The molecular press dehydration method using molecular press dehydrating agents in the present invention makes it possible to dehydrate in a short time, have an advantage of utilizing dehydrated exudate together, and have a superior quality in specific aspect compared to conventional hot air drying or freeze drying.

Accordingly, dehydrated and dried tissues and dehydrated exudates obtained using the molecular press dehydrating agents of the present invention may be usefully applied to various fields of manufacture such as foods and beverages, feeds, beauty materials, medicine, flavorings, agricultural chemicals, coloring agents.

While the invention has been described in terms of a single preferred embodiment, those skilled in the art will recognize that the invention can be practiced with modification within the spirit and scope of the appended claims.

What is claimed is:

1. A method for molecular press dehydration for vegetative tissue comprising contacting the vegetative tissue and a molecular press dehydrating agent comprising a starch hydrolysate or its derivatives, wherein the starch hydrolysate contains a starch fragment with the size of not smaller than 3.5 nm in diameter in an effective amount for inducing cytorrhysis.

2. The method of claim 1, wherein said hydrolysate is a dextrin or a mixture of dextrins.

3. The method of claim 1, wherein said hydrolysate is a maltodextrin or a mixture of maltodextrins.

4. The method of claim 1, wherein said derivatives of starch hydrolysate are one or more selected from the group consisting essentially of polydextrose; fractions of derivatives of amylopectin or amylose; cationic starches substituted by imino alkyl, ammonium alkyl or amino alkyl group; cross linked starches substituted by ethylidene or methylene; etherified starches substituted by carbamyl ethyl, benzyl, allyl, methyl, sulfo alkyl, cyano ethyl, carboxy alkyl or hydroxyl alkyl group; esterified starches substituted by sulfonate ester, aromatic ester, fatty acid ester or carbamate; dialdehyde starch or its derivative; and gelatinized starch.

5. The method of claim 4, wherein said derivatives of starch hydrolysate is a modified starch, main component of which is starch sodium octenyl succinate.

6. The method of claim 1, wherein said molecular press dehydrating agent additionally comprises sodium caseinate of low molecular weight.

* * * * *